United States Patent [19]

Idowu

[11] Patent Number: 5,069,119
[45] Date of Patent: Dec. 3, 1991

[54] EGG SEPARATOR

[76] Inventor: Olajire Idowu, 1734 Mettler Rd., Lodi, Calif. 95242

[21] Appl. No.: 605,246

[22] Filed: Oct. 29, 1990

[51] Int. Cl.⁵ .......................... A23J 1/09; A47J 43/14
[52] U.S. Cl. ........................................ 99/499; 99/498
[58] Field of Search .................................. 99/496–500; 426/490, 495, 478–480

[56] References Cited

U.S. PATENT DOCUMENTS

| | | | |
|---|---|---|---|
| 492,892 | 3/1893 | Lucas | 99/500 |
| 1,101,041 | 6/1914 | Schenk | 99/500 |
| 1,462,606 | 7/1923 | McCrone | 99/499 |
| 1,896,498 | 2/1933 | Taniguchi | 99/497 |
| 2,001,815 | 5/1935 | Clark et al. | 99/497 |
| 2,018,162 | 10/1935 | Weldon | 99/499 |
| 2,187,488 | 1/1940 | Brueggeman | 99/499 |
| 2,496,567 | 2/1950 | Thorpe et al. | 99/499 |
| 2,720,232 | 10/1955 | Denton | 99/499 |
| 3,749,001 | 7/1973 | Swett | 99/499 |
| 4,463,666 | 8/1984 | Papp | 99/495 |

FOREIGN PATENT DOCUMENTS

| | | | |
|---|---|---|---|
| 586375 | 10/1933 | Fed. Rep. of Germany | 99/499 |
| 8703171 | 6/1987 | PCT Int'l Appl. | 99/499 |

Primary Examiner—Timothy F. Simone
Attorney, Agent, or Firm—Robert Charles Hill

[57] ABSTRACT

A device for separating the yolk and albumen of eggs, after removal from the shell, includes a cup-shaped member in an upper portion of a unitary housing for receiving an egg, retaining the yolk and allowing the albumen to overflow the cup-shaped member through surrounding slots into a first chamber in the housing, a lever being operable thereafter to break the yolk and form an opening in the cup-shaped member for allowing the yoke to flow through a tube extending downwardly through the first chamber into a second chamber. The chambers each have inclined floors and chutes for allowing their respective contents to flow into separate containers. A funnel is preferably mounted above the cup-shaped member together with an anvil so that the shell of the egg can be broken on the anvil and the combined yolk and albumen directed into the cup-shaped member by the funnel.

6 Claims, 4 Drawing Sheets

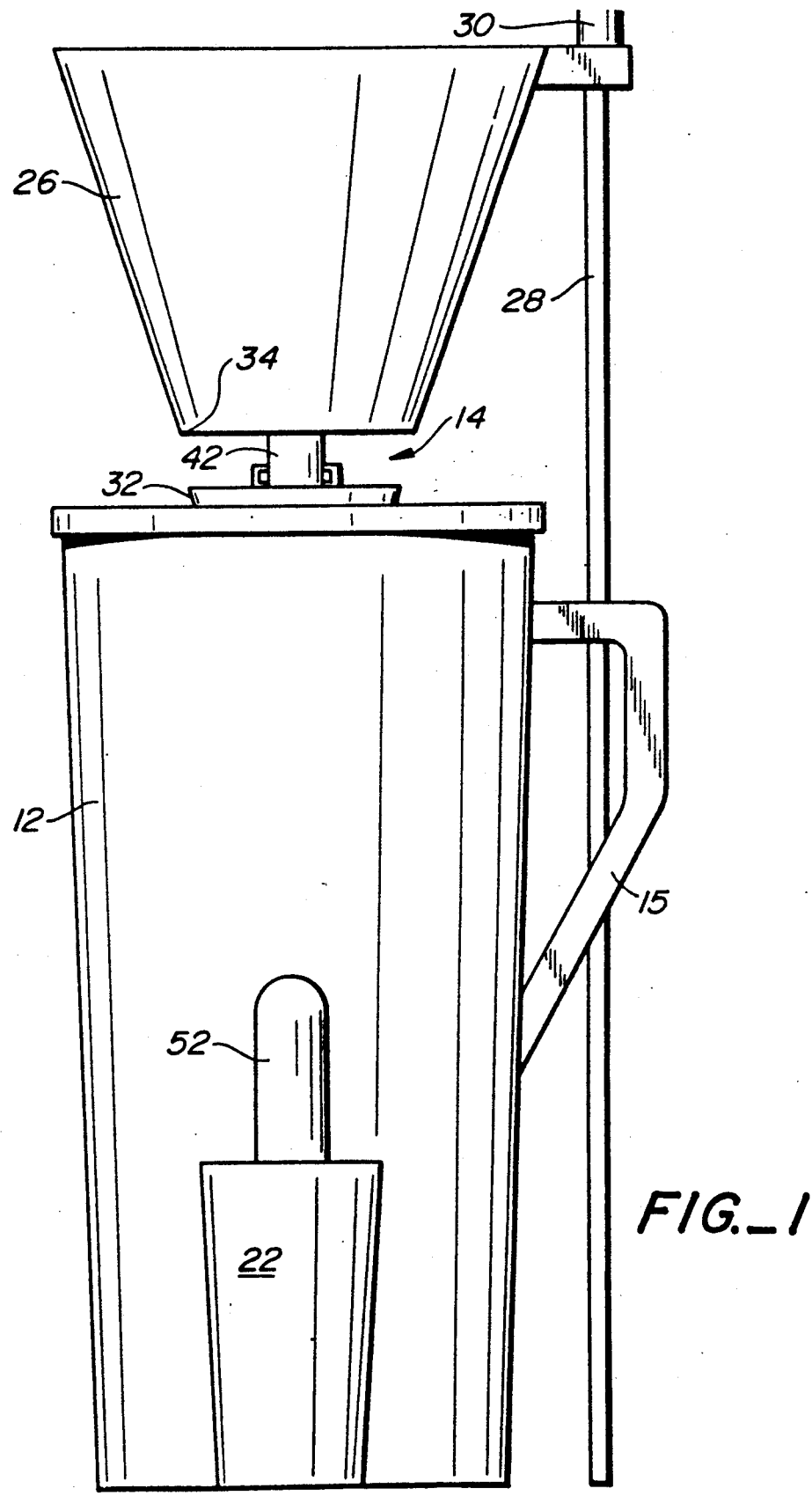
FIG._1

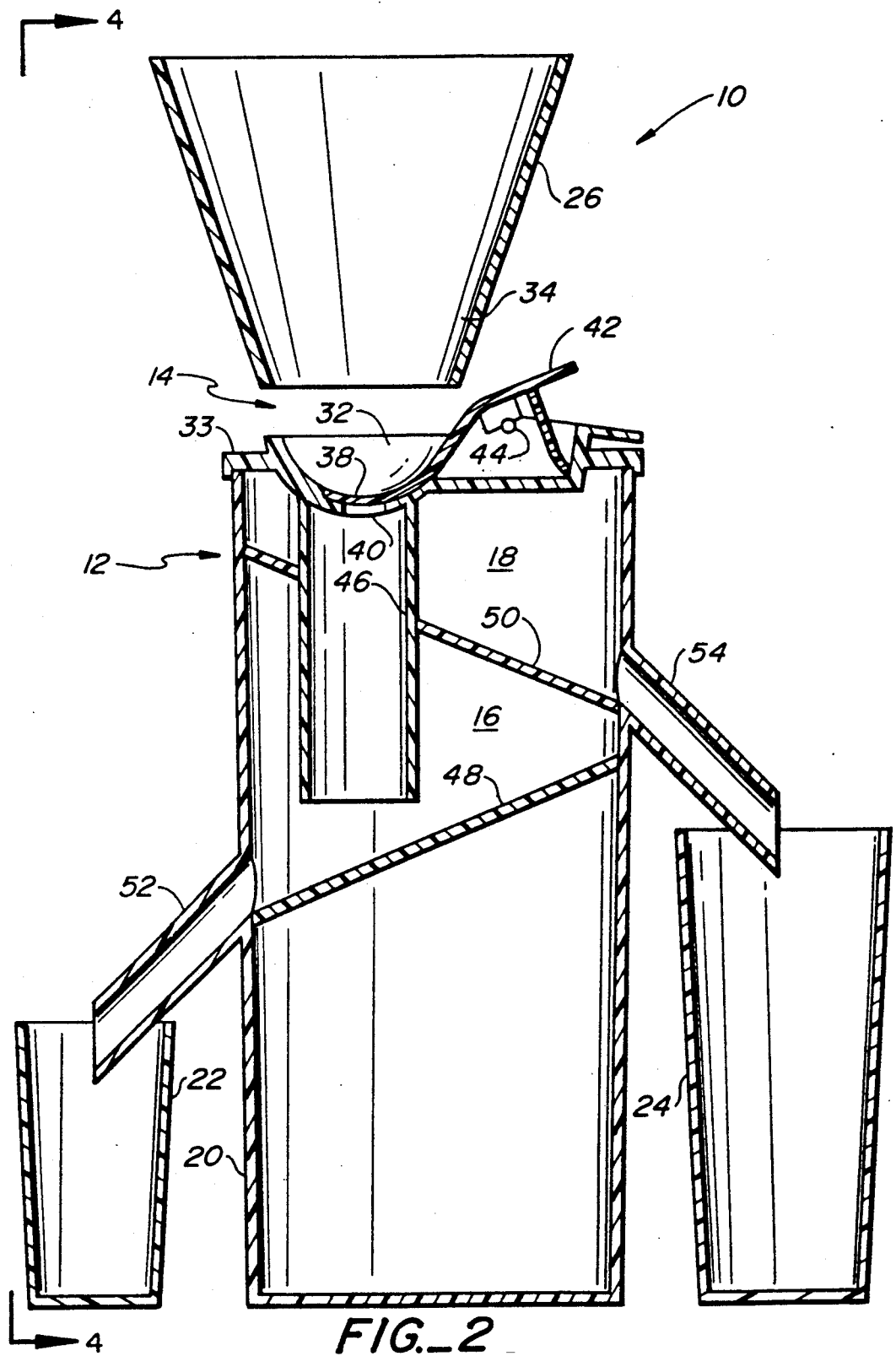
FIG._2

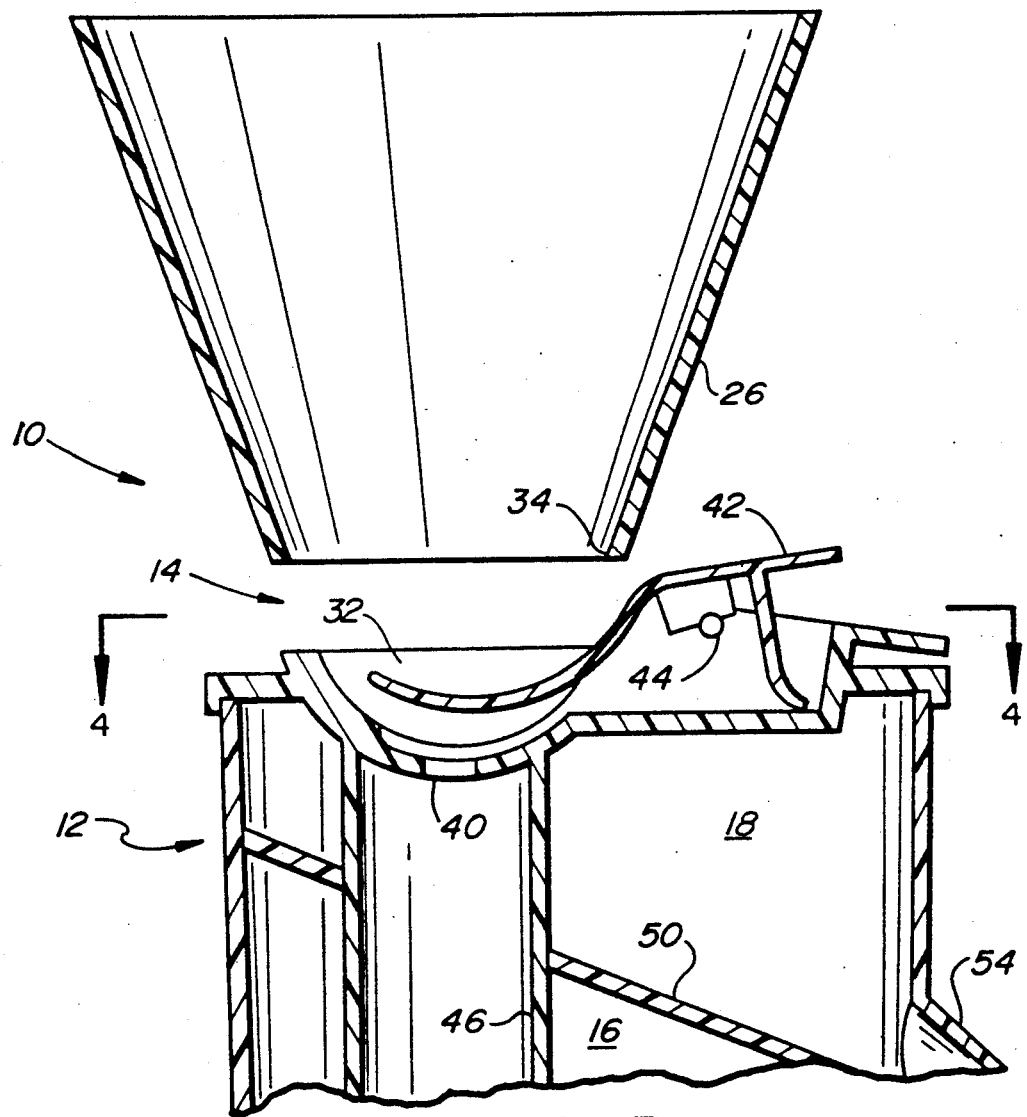
FIG._3

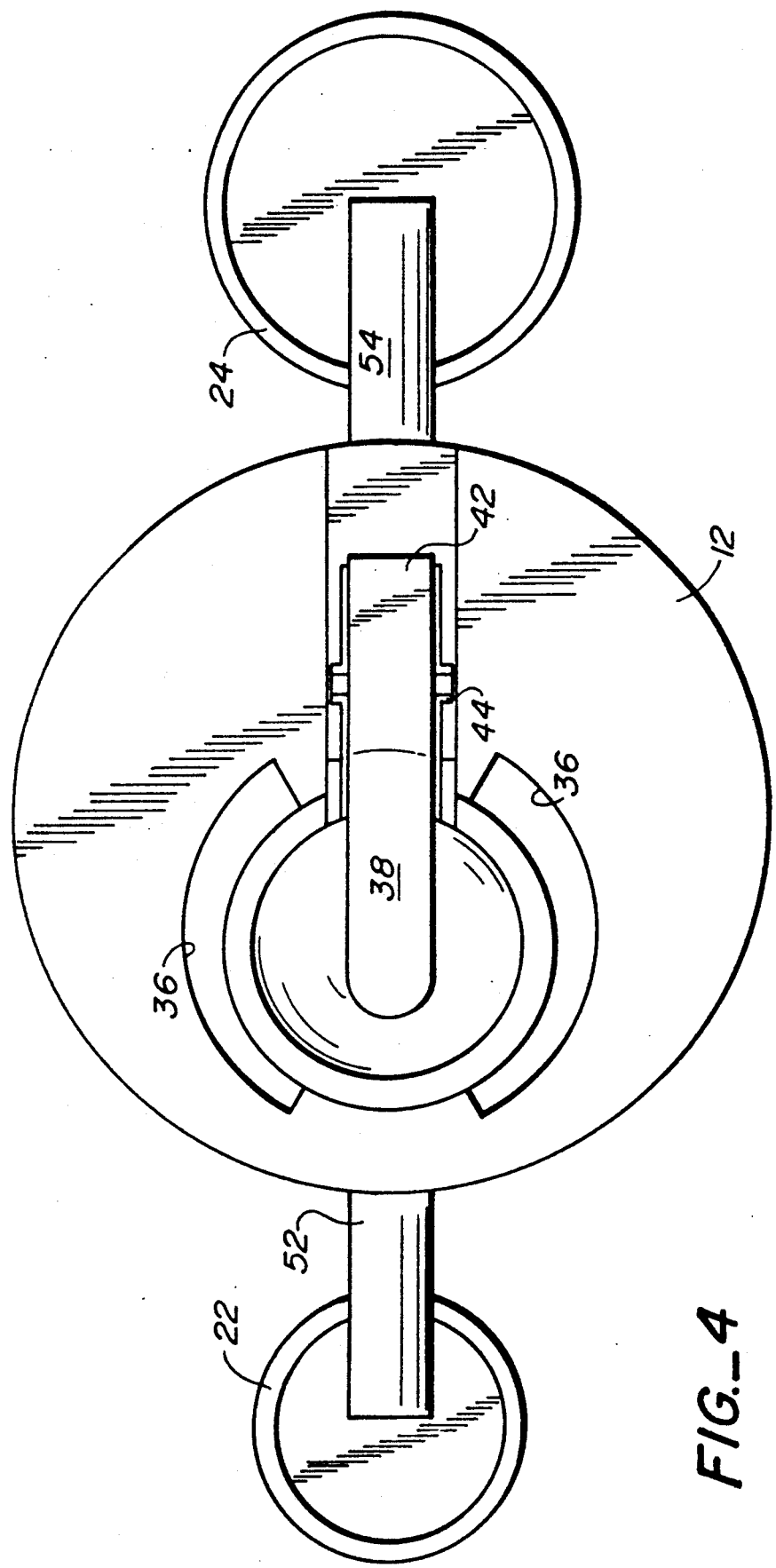
FIG._4

EGG SEPARATOR

FIELD OF THE INVENTION

The present invention relates to a device for processing eggs and more particularly to such a device for separating the yolk and albumen of a single egg or successive eggs after removal of the shell or shells.

BACKGROUND OF THE INVENTION

Numerous devices have been provided in the prior art for processing eggs and more particularly for separating the yolk and albumen of eggs in the manner of the present invention.

Many of these prior art devices either had to be held by hand or suspended over a bowl, cup or the like. Following the separation of the albumen from each egg, it was then often necessary to remove or upend the device for discarding or transferring the yolk from the device before it was in a condition for receiving the next egg.

Devices of this type, which may or may not have included all of the specific features noted above, were disclosed in, for example, U.S. Pat. No. 4,463,666 issued Aug. 7, 1984 to Papp; U.S. Pat. No. 3,749,001 issued July 31, 1973 to Swett; and U.S. Pat. No. 3,656,525 issued Apr. 18, 1972 to Goodart.

Still other devices for separating eggs appeared to contemplate use where relatively large numbers of eggs may be separated. These devices were relatively complex and tended to include substantial numbers of moving parts.

Such devices have been disclosed, for example, in U.S. Pat. No. 4,919,042 issued Apr. 24, 1990 to Rasmussen and U.S. Pat. No. 4,137,837 issued Feb. 6, 1979 to Warren.

Still further examples of devices for separating the yolk and albumen of eggs have been disclosed in U.S. Pat. No. 4,799,423 issued Jan. 24, 1989 to Willsey and U.S. Pat. No. 4,541,330 issued Sept. 17, 1985 to Fujimura.

SUMMARY OF THE INVENTION

The devices disclosed in all of the prior art patents noted above were found lacking for one or more reasons as discussed above. Accordingly, there has been found to remain a need for a device for separating the yolk and albumen of eggs wherein the device is generally self-contained while being of a simple and preferably unitary construction. More preferably, it is also contemplated that the device be particularly simple to use in separating one egg or a series of eggs with a minimum of moving parts in the device. Even more preferably, the device is contemplated for permitting separation of the yolk and albumen under the effects of gravity with separate chamber means formed in the device for respectively receiving the yolk and albumen.

It is more specifically an object of the invention to provide an egg separator comprising a housing which is preferably unitary with a device in an upper portion of the housing for receiving an egg after its shell is broken and for separating the yolk and albumen of the egg, first and second chamber means being formed in lower portions of the housing and intermediate means being formed in the housing for respectively directing the yolk and albumen to flow into the first and second chamber means.

It is a further object of the invention to provide such an egg separator together with a funnel mounted above the housing for directing each egg into the receiving and separating device, the egg separator also preferably including anvil means adjacent the funnel for breaking the egg shell.

The first and second chambers are preferably formed in the housing with inclined floors and chutes for allowing the yolk and albumen to exit the respective chambers.

The device for receiving and separating the eggs preferably is in the form of a cup-shaped member sized for retaining the yolk and causing the albumen to overflow the cup shaped member and flow through slots into the second chamber directly beneath the cup-shaped member.

The cup-shaped member is even more preferably provided with a lever operated element capable of being operated to simultaneously break the yolk after the albumen is separated therefrom and simultaneously to form an opening for allowing the broken yolk to flow downwardly from the cup-shaped member, preferably through a passage in the form of a tube into the first chamber means.

Accordingly, the egg separator of the present invention is generally completely self-contained, possibly with the exception of separate containers for receiving the yolk and albumen of one or more eggs from the respective chambers. However, it is to be noted that the yolk and albumen from a number of eggs could be gathered in the respective chambers and recovered therefrom at a later time when desired. The separator of the present invention also eliminates the need for disassembling or upending the housing in order to remove the yolk therefrom. Rather, the yolk is simultaneously broken and allowed to flow into a receiving chamber by a single actuating member forming the only moving part of the egg separator.

Additional objects and advantages of the invention are made apparent in the following description having reference to the accompanying drawings.

BRIEF DESCRIPTION OF THE DRAWINGS

FIG. 1 is a side view in elevation of an egg separator constructed according to the present invention and illustrated with separate containers for receiving separated yolks and albumens from the separator.

FIG. 2 is a view taken from the right side of FIG. 1, as shown, and with parts in section so that the stand for the funnel does not appear in FIG. 2.

FIG. 3 is an enlarged, fragmentary view corresponding to an upper portion of FIG. 1 to better illustrate a funnel for directing the yolk and albumen together into a cup-shaped member with an actuating element being moved to a position for breaking the yolk and forming an opening for allowing the yolk to flow from the cup-shaped member.

FIG. 4 is a view taken along section line 4—4 of FIG. 3 to provide a top view of the egg separator without the funnel or its support.

DESCRIPTION OF THE PREFERRED EMBODIMENT

Referring now to the drawings and more particularly to FIGS. 1–4 in combination, an egg separator constructed according to the present invention is generally indicated at 10. The egg separator 10 includes a housing 12 which is preferably unitary and has a device 14 in a upper portion of the housing 12 for receiving and separating eggs after they are removed from their shells. A handle 15 is attached to the housing 12, as illustrated in FIG. 1.

The housing 12 also forms first and second compartments or chambers 16 and 18 formed in a lower portion of the housing relative to the receiving and separating device 14. The housing also has a base portion 20 serving merely to elevate the first and second chamber 16 and 18 respectively so that the yolk and albumen from one or more eggs may flow from the device 14 into the chambers and preferably from the chambers into separate containers or receptacles 22 and 24 entirely by gravity.

With the above components being formed in the manner described, the housing 12 is generally unitary with the yolk and albumen flowing into respective chambers and preferably from the chambers into separate containers by gravity in a particularly simple manner.

Before describing the construction of the housing 12 in greater detail, it is noted that a funnel 26 is supported above the device 14 by a stand 28, an anvil 30 also being mounted on the stand 28 adjacent the funnel 26 to facilitate breaking of the egg shell. Thereafter, the yolk and albumen from the broken egg shell may be allowed to flow downwardly through the funnel 26 into the device 14 in order to simplify use of the separator and to avoid the need for precise hand-eye coordination.

The device 14 includes a cup-shaped member 32 which is sized for receiving and retaining a typical yolk (not shown) of an egg (also not shown). The cup-shaped member 32 is formed as part of a removable cover 33 for the housing 12. The cup-shaped member 32 also generally conforms with the size of an opening 34 formed in the bottom of the funnel to assure that the yolk and albumen flow downwardly through the funnel and are intercepted by the cup-shaped member.

Referring particularly to FIG. 4, the housing 12 is formed with slots 36 generally surrounding the cup-shaped member 32. Thus, when an egg flows downwardly through the funnel 26, the yolk tends to be retained within the cup-shaped member 32 while the albumen overflows the cup-shaped member 32 and is directed by the slots 36 into the second chamber 18 directly beneath the cup-shaped member 32.

With the device 14 being in its normal configuration for receiving an egg, a curved element 38 closes an opening 40 in the bottom of the cup-shaped member 32. The curved element 38 is attached to a lever 42 which is pivotably mounted at 44 on the housing 12.

Thus, after the albumen of each egg has been allowed to overflow the cup-shaped member 32 so that only the yolk is retained thereon, the curved element 38 is operated by the lever 42 in the manner illustrated in FIG. 3 so that it moves upwardly to simultaneously break the yolk and expose the opening 40 in the base of the cup-shaped member 32.

A passage or tube 46 is vertically formed beneath the opening 40 in the cup-shaped member 32 and extends through the second chamber 18. Accordingly, when the yolk is broken and the opening 40 exposed by operation of the lever 42, the yolk flows downwardly through the tube 46 into the first chamber 16.

The first and second chambers are preferably formed with inclined floors 48 and 50 respectively. Chutes 52 and 54 are arranged on the housing 12 and extend outwardly from the lowermost portion of the inclined floors 48 and 50 so that, with the containers 22 and 24 positioned as shown, the yolk and albumen may flow directly from the device 14 through the respective chambers 16 and 18 into the containers 22 and 24 by means of the chutes 52 and 54 respectively.

The method of operation for the egg separator 10 is believed to be fully described above together with its various components.

Numerous modifications can be made within the purview of the present invention. For example, the housing 12 could be modified with the first and second chambers 16 and 18 being closed so that the yolks and albumen or white of successive eggs are collected therein. Means (not shown) could then be provided if desired for releasing the contents when desired from the respective chambers.

Other modifications and additions could also be made within the scope of the present invention which is accordingly defined only by the following claims which are further exemplary of the invention.

What is claimed is:

1. An egg separator comprising
   a unitary housing,
   means in an upper portion of the housing for receiving an egg and separating the yolk and albumen of the egg,
   a cup-shaped member sized for retaining the yolk and for causing the albumen to overflow the cup-shaped member,
   first and second chamber means formed in lower portions of the housing,
   intermediate means in the housing for respectively directing the yolk and albumen to the first and second chamber means,
   means movably mounted on the cup-shaped member for breaking the yolk into an opening for allowing the yolk to flow downwardly from the cup-shaped member, and
   a slot adjacent the cup-shaped member for directing the albumen to the second chamber means and passage means beneath the opening in the cup-shaped member for directing the yolk to the first chamber means.

2. The egg separator of claim 1 wherein the second chamber means is formed immediately beneath the cup-shaped member, the first chamber means being formed beneath the second chamber means and passage means comprising a tube open at its upper end beneath the cup-shaped member and extending downwardly through the second chamber means into communication with the first chamber means.

3. The egg separator of claim 2 wherein the first and second chamber means are formed with inclined floors and chutes for allowing the yolk and albumen to exit the respective chamber means.

4. The egg separator of claim 1 wherein the first and second chamber means are formed with inclined floors and chutes for allowing the yolk and albumen to exit the respective chamber means.

5. The egg separator of claim 4 further comprising a funnel mounted above the housing for directing the egg to the receiving and separating means.

6. The egg separator of claim 5 further comprising anvil means adjacent the funnel for breaking the shell of the egg.

* * * * *